United States Patent Office 3,300,870
Patented Jan. 31, 1967

3,300,870
MULTISTAGE PNEUMATIC CONVEYING
DRYING EQUIPMENT
Yujiro Sugahara, Hiroshi Tsuchida, Kiyoshi Sato, and Koichi Usui, Tsuruoka-shi, Yamagata-ken, Japan, assignors to Mizusawa Kagaku Kogyo Kabushiki Kaisha, Osaka, Japan, a corporation of Japan
Filed Mar. 23, 1964, Ser. No. 353,760
3 Claims. (Cl. 34—57)

The present invention relates to improvement in multistage pneumatic conveying drying equipment.

There has been well known heretofore a so-called pneumatic conveying drying method wherein granules to be dried are dispersed into a hot air stream thereby drying the granules during their movement. There has also been a variety of equipment introduced for this method. In such a known art, a granule crushing machine of a construction constituting a minimum obstacle to the flow rate was usually disposed in the drying duct for the purpose of improving the drying efficiency by further crushing the wet granules to be dried into a size smaller than that which is just small enough to be carried on the hot air. This increases the surface area of the granules.

However, such a conventional technique as described above had drawbacks. The finely divided granules tended to be flown away by the exhaust air and therefore collection of such granules could not be accomplished to the satisfactory extent with the use of a known collector such as for example, a cyclone dust collector. While, for example, a bag filter may be employed for a better collection, the use thereof not only tends to wet the filter cloth but also presents deterioration of the material when a high temperature exhaust air is involved in the process. Moreover the use of a bag filter in a large scale operation is not practical. On the other hand, application of such collectors, such as a cyclone scrubber or venturi scrubber, to obtain complete collection of finely divided granule products would not be advantageous because it requires an additional process for separating water from the products collected due to the use of water. In addition, materials of the collectors would be corroded and/or worn off. Furthermore electric collectors are too expensive to use from the economical standpoint.

Another defect in the conventional technique results from disposing the crushing machine in an air stream in which granules to be dried are carried, because, in such an arrangement, the crushing machine is required not to reduce the rate of air stream substantially and as a result the structural design thereof is obliged to be restricted. Accordingly, when the crushing machine is operated beyond its capacity as seen in most cases, heavy wear of the machine cannot be avoided.

In view of the above, one of the prime objects of the invention is to provide an improved multistage pneumatic conveying drying equipment suitably employed in drying of wet granules.

Another object of the invention is to provide a multistage pneumatic conveying drying equipment for drying wet granules with the least loss of finely divided granule products.

Still another object of the invention is to provide a multistage pneumatic conveying drying equipment for drying wet granules to which a crushing machine of an optional structural design may be adapted with no concern as to its wear.

Other objects and advantages of this invention will be apparent from the description provided hereinafter.

These objects aforementioned may be attained by employing a multistage pneumatic conveying drying equipment for drying wet granules, according to the invention, comprising at least two drying ducts including a preliminary drying duct for preliminarily drying wet granules and a finishing drying duct for finishing the drying thereof, a means of feeding the wet granules into the preliminary drying duct, a means of collecting the preliminarily dried granules delivered from the preliminary drying duct, a means of forwarding said collected preliminarily dried granules to a drying duct of the next stage, a means of collecting dried granules delivered from the finishing drying duct, a means of blowing hot air into the finishing drying duct, a means of sending the hot air discharged from the finishing drying duct into a pneumatic conveying drying duct of the next stage and a means of exhausting the air discharged from the preliminary drying duct. Such equipment is characterized in that a means of generating swirls to cause swirls in the exhausted air current is supplied between the place where the means of sending said exhaust hot air from the air current drying duct, the next stage to the preliminary drying duct, to said preliminary drying duct is connected with said preliminary drying duct and the place where said means of forwarding the wet granules being dried into the preliminary drying duct is connected with the preliminary drying duct, thereby dispersing the preliminarily dried granules in the air current. A means of crushing said preliminarily dried granules between said means of collecting the preliminarily dried granules and said means of forwarding the preliminarily dried granules into the drying duct of the next stage, are provided.

With reference to the accompanying drawings.

Figure 1:
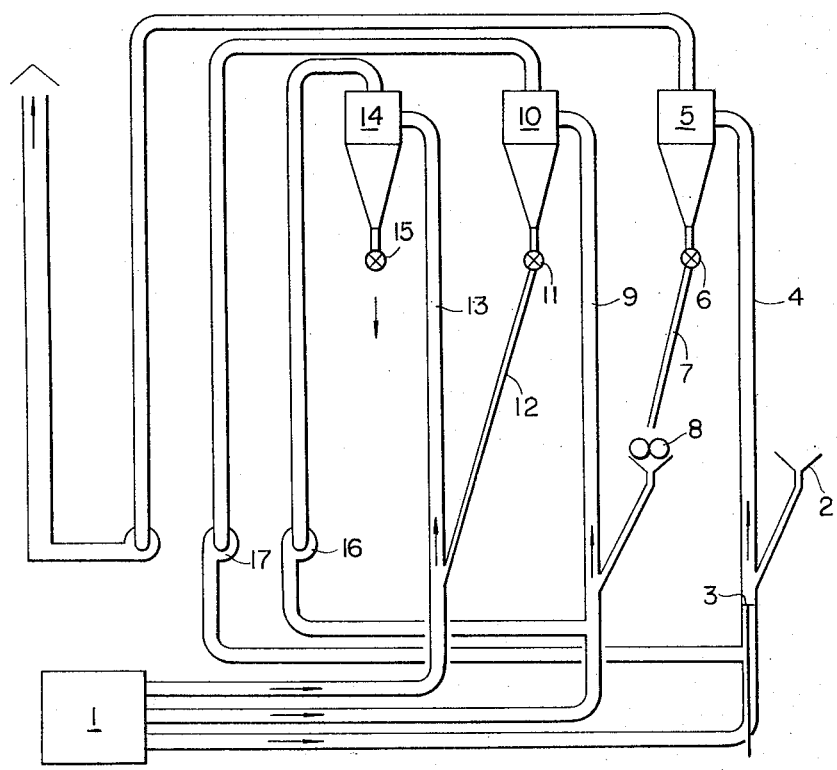
FIG. 1 is the illustrative view of an equipment embodying this invention.
Figure 2:
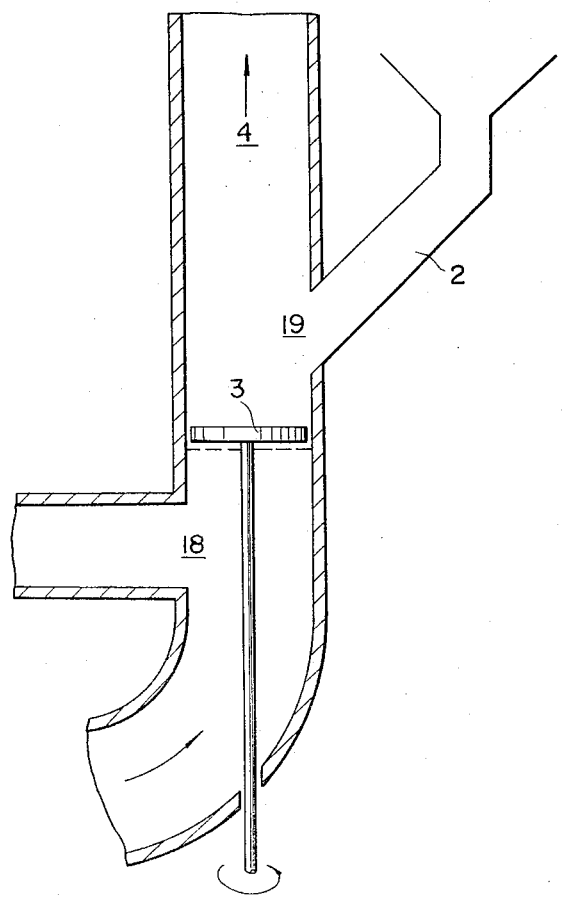
FIG. 2 is an enlarged view showing the vicinity of a swirl generating means disposed in a pneumatic conveying drying duct.

Hot air from a hot air furnace 1 is divided and blown into a preliminary drying duct 4, an intermediate drying duct 9 and a finishing drying duct 13 respectively. Wet fine granules to be dried are fed from a supply vessel 2, dispersed into the air current in the preliminary drying duct by means of a rotary swirl generator 3, thereby losing a part of their moisture and concurrently adsorbing fine powders being present in the air stream, passed into cyclone collector 5 whereupon being separated from air, and after passing through a rotary valve 6, passed into an intermediate drying duct 9 via a chute 7 and a granule crushing machine 8. The granules, after being subjected to the secondary drying in the drying duct 9 and separated by the cyclone collector 10, enter into a finishing drying duct 13 via a rotary valve 11 and a chute 12, thereby losing water to a predetermined level and pass through a cyclone collector 14 and a rotary valve 15 thereby becoming finished products. On the other hand, hot air exhausted from the cyclone collector 14 of the finishing drying duct 13 containing dried fine powders is led into the intermediate drying duct 9 by means of an air exhauster 16, wherein it is mixed with the hot air from the hot air furnace 1, thereby supplementing its heat capacity for the drying. Also the fine powders of the products existing in said hot air are caused to contact with semidried product in the intermediate drying duct 9, whereupon they are absorbed by said semi-dried products for subsequent collection. The remaining fine powders which are passed into the preliminary drying duct 4 via the cyclone collector 10 and an air exhauster 17 being accompanied by the hot air, are caused to contact with wet granules dispersively suspended above swirls, down stream from the swirl generator 3, and are collected essentially as adsorbed by said wet granules. The thermal energy of the hot air exhausted from the intermediate drying duct 9 and the finishing drying duct 13 is thoroughly utilized at the preliminary drying duct 4, wherein wet coarse granules are dried, thereby extremely enhancing the thermal efficiency of the system.

Figure 3:
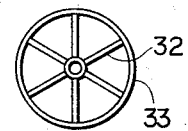
FIG. 3 is a plan view of one example of the swirl generating means.
Figure 4:
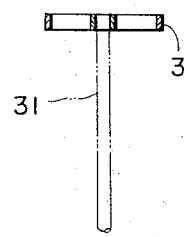
FIG. 4 is a cross-sectional view of the means shown in FIG. 3.

A swirl generating means adapted to the equipment of the invention may be composed, as shown in FIG. 3 and FIG. 4, of a rotatable axis 31, a plurality of vanes 32 radially fixed around said axis, which generate swirls upon rotation, a member 33 mechanically reinforcing said vanes and a rotation driving means (as not shown in the figures). The swirl generating means to be employed in this invention, however, is not limited to that illustrated in the figures but minor modifications thereof may easily be effected by those skilled in the industry. It should be understood that a swirl generating means of any mechanism may be employed in the invention providing that the mechanism is capable of generating swirls in an air stream, thereby dispersively suspending wet granules therein which are supplied into the swirls.

The above swirl generating means must be provided at a place between the spot 18 where a duct through which the hot air exhausted from a drying duct (such as, for example, the intermediate drying duct 9), the next stage to the preliminary drying duct, is sent to the preliminary drying duct, is connected with the preliminary drying duct and the spot 19 where the supply pipe 2 for the wet granules is connected with the preliminary drying duct. While it is essential to provide the swirl generating means 3 in the preliminary drying duct 4, it may also be provided in the intermediate drying duct and/or in the finishing drying duct.

The means of dividing preliminarily dried granules must be provided at a place subjected to no effect of the air stream, that is, a place between the means of collecting the preliminarily died granules and a means of supplying said granules to the drying duct of the next stage. Said means of dividing the preliminarily dried granules may include a roll crusher or others of a suitable structure. A crusher of a suitable structural design and having the desired capacity adaptable to the intended service may easily be chosen by one skilled in the art. A crusher may also be provided in the process in which unfinished product collected from the intermediate drying duct is forwarded to the drying duct at the latter stage, if desired.

Wet granules which may efficiently be dried with the use of equipment of the invention include those having a diameter larger than about 100$\mu$. These can be collected completely by a usual cyclone. Those granules having a diameter small than about 100$\mu$ may preferably be first processed for pellet forming before being fed into the preliminary drying duct. For instance, clays such as acid clay and kaolin containing more than about 20% water, activated clay containing more than about 40% water, gypsum containing more than 10% water, pigments containing more than about 20% water, resins containing more than 10% water, aluminas containing more than about 40% water, and silicates containing more than about 40% water may be dried at a high efficiency, as they are or after being formed into pellets if required, with the equipment of the invention.

When the wet granules supplied to the preliminary drying duct 4 have a diameter larger than about 100$\mu$, they may be carried on the exhaust air stream containing fine powders of the product with the aid of a swirl generating means, thereby not only recovering the exhaust heat but adsorbing said fine powders in the stream. As a result, the air stream going into the collection means 5 contains little of the fine powdery product which is hard to collect, hence permitting the use of an ordinary cyclone for said collection means 5. The preliminarily dried product with the fine powders of the product adsorbed thereon are finely divided for the first time by a crusher 8 disposed outside the air stream before entering into the drying duct of the next stage. Said crusher 8, located outside of the air stream, may be of an optional structure and capacity. Additionally, since no vulnerable materials to damage and wear are involved in the path of air stream in the invention's equipment, a smooth and continuous operation for a long period of time at a high efficiency is possible.

Using a three-stage vertical pneumatic conveying drying equipment of the type as illustrated in FIG. 1, wet activated clay having an average grain diameter of about 5 mm. and containing 61% of water was dried up to 12% water content at the rate of 1250 kg. (in dry condition) per hour. The resultant product was crushed by the roll crusher 8 into a size of 1 mm. or smaller in diameter. The temperature of the hot air from the hot air furnace 1 was about 830° C.; the quantity of the fuel oil consumed was 150 l./hr.; the total amount of exhaust gas generated including the combustion gas and aqueous vapor evaporated was 9000 Nm.$^3$/hr; and the exhaust temperatures at the 1st stage (preliminary), 2nd stage (intermediate) and 3rd stage (finishing) were 110 C., 190° C. and 300° C. respectively being reduced to a thermal efficiency of about 75%. Further the amounts of water evaporated at each stage were 430 kg./hr., 580 kg./hr. and 560 kg./hr. in order while the moisture contents of activated clay processed at the outlet of each stage were 53%, 38% and 12% respectively.

The amount of fine powders in the exhaust gas generated during the above process was calculated in such manner that a portion of the exhaust gas was passed through a cooler, thereby condensing the gas into a liquid, which was subsequently dried to obtain the fine powders contained in the gas. Thereafter, the fine powder concentration was calculated based on the weight of the fine powders and the amount of said liquid.

The result showed that the liquid temperature was 56.5° C., the fine powder concentration was 1.8 g./l. and the total amount of the condensed liquid was 600 l./hr., which represents the total amount of the fine powders to be 1.1 kg./hr. This amount constitutes only 0.1% of 1250 kg./hr., the total amount of grains dried.

In the past, when wet granular activated clay containing approximately 61% of water was dried in a rotary kiln the resultant dried product normally took a form of granules and in this instance, the amount of powdery clay flown away reached as much as 5% of the quantity of the clay dried. As seen in the above, a great loss was inevitable, even with the clay subjected to a prior processing for pellet forming, to reduce the powder flowing away.

The equipment of this invention, however, enables one to produce dried powdery activated clay in which a loss incurred thereupon is not more than 0.1% as noted above.

We claim:

1. Multistage pneumatic drying apparatus wherein each stage comprises a drying duct, means for feeding granules to be dried into the drying duct, means for supplying hot air to the drying duct for drying granules in the duct whilst carrying them therethrough, and a separator at the discharge end of the drying duct for separating dried granules from the drying air, wherein conduits are provided for leading the air from the separator of each stage except the first stage back to the drying duct of the preceding stage, the air conduit from the separator of the first stage leading to exhaust, wherein means are provided for feeding granules discharged from the separator of each stage except the last stage to the drying duct of the next stage, means for crushing partly dried granules being provided at a location between the separator of the first stage and the drying duct of the second stage and being free from the influence of an air stream, and wherein swirl generating means are provided for causing swirling of air to be passed through the first drying duct, said swirl generating means being positioned in the drying duct upstream of the means for feeding wet granules into the first drying duct.

2. A multistage pneumatic conveying drying equipment as disclosed in claim 1 above, in that an average diameter of the wet grandules is at least about 100$\mu$.

3. A multistage pneumatic conveying drying equipment as disclosed in claim 2 above, in that a means of collecting the preliminarily dried granules is a cyclone collector.

References Cited by the Examiner

UNITED STATES PATENTS

| | | | |
|---|---|---|---|
| 2,068,077 | 1/1937 | Rosin et al. | 34—57 |
| 2,235,683 | 3/1941 | Horesi | 34—57 |
| 2,274,789 | 3/1942 | Horesi | 34—10 X |
| 2,406,395 | 8/1946 | Noel | 34—10 |
| 2,513,370 | 7/1950 | Shaw | 34—57 |

FREDERICK L. MATTESON, JR., *Primary Examiner.*

JOHN J. CAMBY, *Examiner.*

D. A. TAMBURRO, *Assistant Examiner.*